June 22, 1937.  A. GRÜN  2,084,681

EYESHIELD FOR WELDING DEVICES

Filed Jan. 8, 1936

Inventor
Arnold Grün by Karl Michaelis
Atty.

Patented June 22, 1937

2,084,681

UNITED STATES PATENT OFFICE 2,084,681

EYESHIELD FOR WELDING DEVICES

Arnold Grün, Oberesslingen, Germany

Application January 8, 1936, Serial No. 58,031
In Germany January 11, 1935

3 Claims.  (Cl. 2—8)

My invention relates to the art of welding metals by electricity and more especially to means for protecting the eyes of the workmen from being affected by the glare of the welding arc.

It is an object of my invention to provide means inserted in the welding circuit for automatically covering the eyes of the workman while the arc is at its maximum, uncovering them only whenever the arc emits little or no light.

As is well known to those skilled in the art, the light emitted by the arc contains also ultraviolet rays, which in the course of time damage the eyes and the workman is therefore compelled to wear glasses which limit the glare of the arc to the extent that the eyes are no more affected. These glasses are quite especially required to absorb the ultraviolet rays. Now the necessity of wearing very dark-colored glasses involves another disadvantage: the workman now sees the object to be welded and the welding spot or seam only as long as the arc burns. Whenever the arc is extinguished and also before the welding operation is started, he is compelled to remove his glasses and to move the electrode close to the point at which the welding shall be started. Before the start he must place the glasses on and consequently, before and while the arc is formed, he must handle the electrode without seeing the work.

The device according to the present invention is designed to enable the workman to work without protective glasses or at least to use comparatively light-colored glasses. To this end a movable diaphragm is arranged in front of his eyes, this diaphragm completely covering the eyes during a predetermined interval of time $T_1$, exposing it only during the succeeding interval $T_2$. $T=T_1+T_2$ should be about one fifteenth of a second, but may of course be shorter or longer. The periods of covering and uncovering the eyes should follow each other rhythmically, the welding circuit being rhythmically closed and interrupted in such manner that during the interval $T_1$ the arc is formed between the electrode and the workpiece, while it is interrupted during the interval $T_2$. Therefore the workmen can see the workpiece and the electrode during the interval $T_2$, without being blinded by the arc. As soon as the arc is formed, the workman's eyes are protected by the diaphragm.

I thereby succeed to prevent the injurious violet rays of the arc from reaching the eyes. In case that the welding spot just heated by the arc or the electrode should still emit an unduly strong light, the eyes may be protected by comparatively light-colored glasses, such as are used for instance when welding by gas. Glasses of this kind permit also the surroundings of the heated points to be absorbed.

When welding with alternating current, the interval $T$ may be so chosen as to be equal to one half period of the alternating current. Obviously care must be taken to provide that the opening and closing of the diaphragm occurs within the right phase relative to the welding current.

Obviously the two intervals $T_1$ and $T_2$ need not be equal in length.

In the drawing affixed to this specification and forming part thereof, a device embodying my invention is illustrated diagrammatically by way of example.

Figure 1:
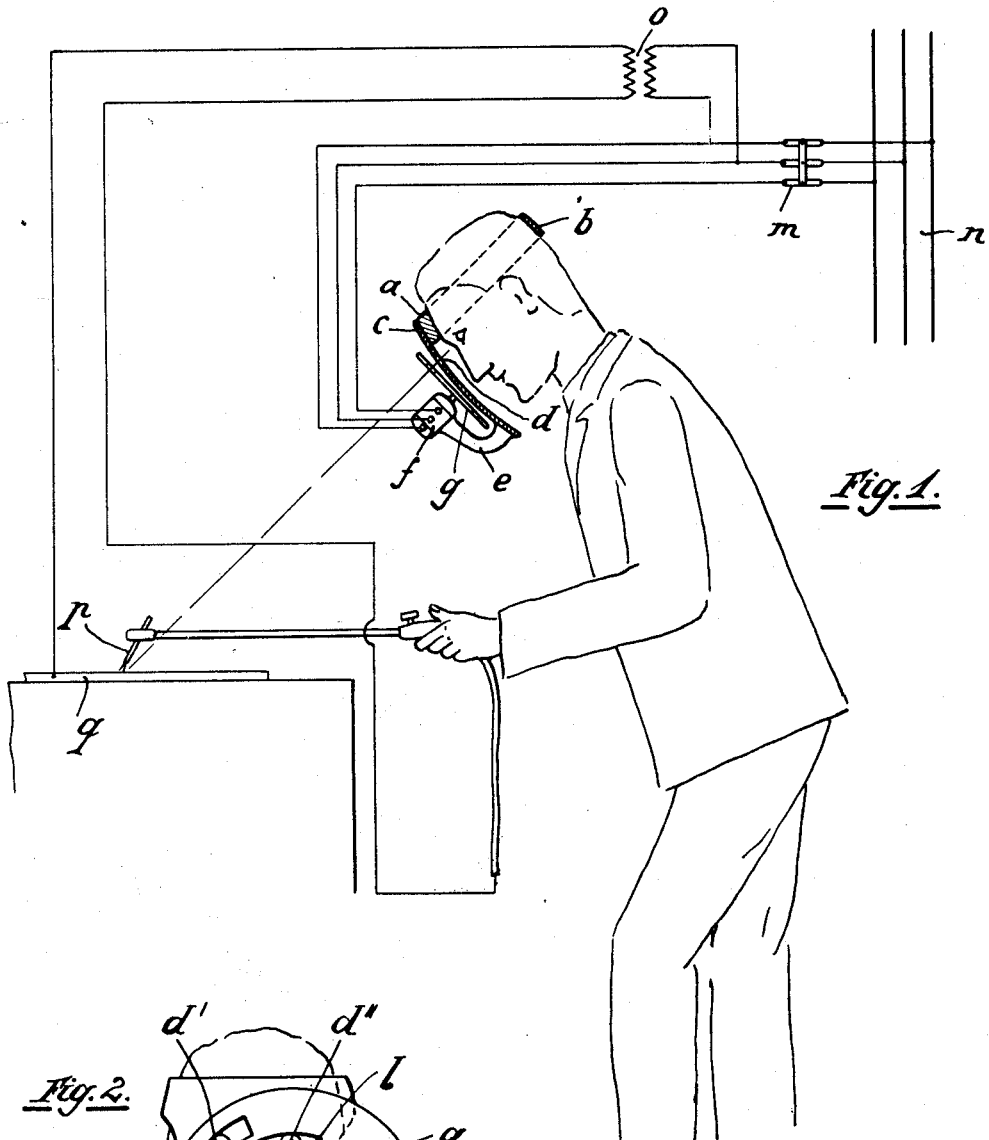
Fig. 1 is an elevation, partly in section, illustrating in a purely diagrammatic manner the construction and use of the device in the welding operation.
Figure 2:
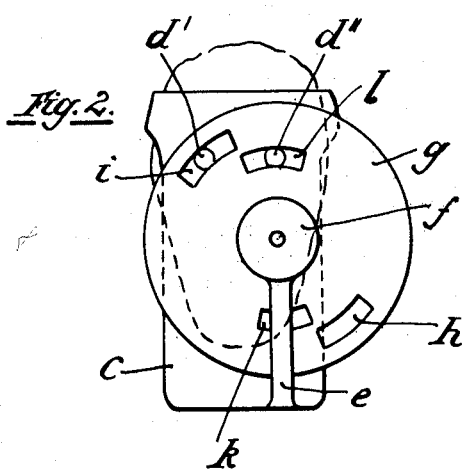
Fig. 2 is a front elevation of the device proper drawn to a larger scale.

Referring to the drawing, $c$ is a plate or shield and $b$ is a strap to be placed around the head of the workman, $a$ being a pad interposed between the shield and the head. $d'$ and $d''$ are two apertures spaced similarly as the two eyes. $e$ is an arm extending from the bottom end of the shield $c$ and $f$ is an alternating current synchronous motor. $g$ is a diaphragm mounted on the motor shaft, this diaphragm being formed with four segment shaped apertures, two of which ($h$ and $i$) are arranged at a larger, the two others ($k$ and $l$) at a smaller distance from the centre point, and this in such manner that the apertures $h$ and $i$, when the diaphragm $g$ is rotated by the motor, alternately uncover the aperture $d'$, the apertures $k$ and $l$ the aperture $d''$ in the shield. The electromotor $f$ is connected to the net $n$ over the switch $m$ in three phase connection. Across the transformer $o$ is branched, from two phases, the current which leads to the welding electrode $p$ and to the workpiece $q$.

The position of the apertures $h$, $i$, $k$, $l$ on the diaphragm $g$ is so chosen relative to the apertures $d'$ and $d''$ in the shield $c$ and to the arrangement of the windings and terminals of the electromotor $f$, that at the moment when in the alternating current phase used for the formation of the arc the current has about reached its maximum, the apertures $d'$, $d''$ are covered, being uncovered only as long as the welding current is near to its minimum and the arc emits only little light.

I wish it to be understood that I do not desire to be limited to the exact details of construction shown and described for obvious modifications will occur to a person skilled in the art.

I claim:—

1. Protective eye shield for welding devices comprising in combination, an apertured shield, a diaphragm movably supported in front of said shield, means for moving said diaphragm, an electric welding tool, means for supplying to said diaphragm moving means and to said tool an electric current which changes rhythmically between a maximum and a minimum, and a connection between said current supplying means, said diaphragm moving means and said tool whereby said diaphragm is forced to move in the rhythm prescribed by the current, being made to cover the aperture of said shield, whenever the current is near its maximum, and being made to uncover the aperture whenever the current is near its minimum.

2. Protective eye shield for welding devices comprising in combination, a welding tool, an apertured shield, an electromotor in front of and supported by said shield, a diaphragm supported by said electromotor for rotation in front of said shield and a source of current for supplying to said tool and to said electromotor a current rhythmically changing between a maximum and a minimum, the connection between said source of current and said tool and electromotor being so arranged as to cause rotation of said diaphragm in front of said shield and the striking of the welding arc during the intervals between two successive opening positions of said diaphragm.

3. The device of claim 1, in which the diaphragm is formed with two pairs of diametrically opposed apertures differently spaced from the centre of rotation of the diaphragm.

ARNOLD GRÜN.